W. W. HARMAN.
CUT-OFF VALVE FOR SAWMILL CARRIAGES.
APPLICATION FILED DEC. 26, 1916.
1,285,695.
Patented Nov. 26, 1918.
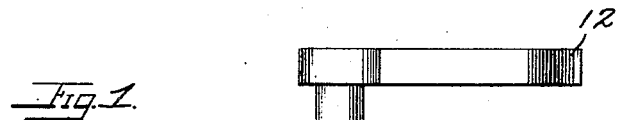
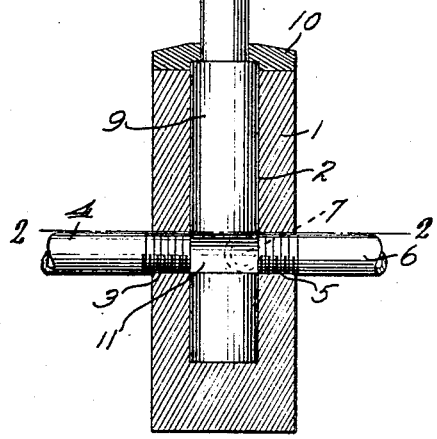
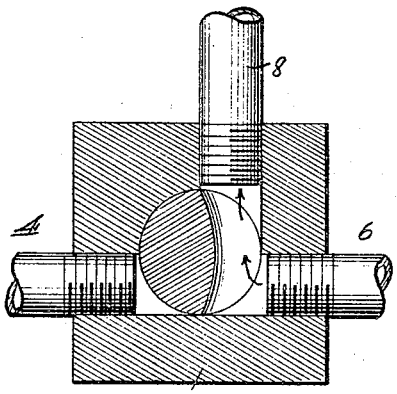
Inventor
William W. Harman
By Geo. P. Kimmel.
Attorney

UNITED STATES PATENT OFFICE.

WILLIAM W. HARMAN, OF WILLIAMSPORT, PENNSYLVANIA.

CUT-OFF VALVE FOR SAWMILL-CARRIAGES.

1,285,695.  Specification of Letters Patent.  Patented Nov. 26, 1918.

Application filed December 26, 1916. Serial No. 138,947.

*To all whom it may concern:*

Be it known that I, WILLIAM W. HARMAN, a citizen of the United States, residing at Williamsport, in the county of Lycoming and State of Pennsylvania, have invented certain new and useful Improvements in Cut-Off Valves for Sawmill-Carriages, of which the following is a specification.

This invention relates to steam engine valves, and more specifically to cut-off valves for saw mill carriages.

The object of my invention is to provide a cut-off valve adaptable for use in connection with a steam operated mechanism for controlling saw mill carriages. It is a well known fact in connection with saw mill operations that conditions often arise which render it necessary or desirable to immediately stop the carriage. With the present type of valve this is impossible, since when the steam is cut off in the inlet pipe, a quantity of steam still remains in the cylinder. My invention embodies means whereby, when the steam is cut off, any residual steam in the cylinder will be instantly exhausted therefrom, thus insuring an instant and positive stopping of the saw mill carriage, and lessening the danger of accident in such operations.

Furthermore, I provide a simple, durable device, cheap in the cost of manufacture and one that may be readily installed upon any machine.

Other objects of this invention not at this time more particularly enumerated, will be clearly understood from the detailed description and drawings forming a part of this specification.

Furthermore, this invention consists in the novel arrangements and combination of parts more particularly described in the following specification and embodied in the claim appended hereunto and forming a part of this application.

Referring now to the drawings, which are merely illustrative of my invention,

Figure 1 is a vertical section of my improved cut-off valve.

Fig. 2 is a horizontal section taken on the line 2—2 of Fig. 1 showing the valve open admitting steam into the cylinder.

Fig. 3 is a similar view showing the valve in closed position allowing the steam to be exhausted from the cylinder.

Referring further to the drawings, wherein similar reference characters designate similar parts throughout the respective views, 1 designates a valve casing made of any suitable material provided with a vertical bore 2 centrally thereof and extending downwardly a certain distance. Said casing is provided with an inlet port 3 adapted to receive a pipe 4 from the boiler. An outlet port 5 is located within said casing 1 opposite said inlet port 3 and is adapted to receive a pipe 6 for conveying the steam to the cylinder. A secondary outlet port 7 is located within said casing 1 and at right angle alinement to said inlet port 3 and outlet port 5 and is adapted to receive a pipe 8 permitting the exhaust of steam which is in the cylinder when the valve is cut off. A valve stem 9 coextensive in size with said bore 2 is adapted to seat within said bore and be retained therein by means of a cap 10 secured to the casing 1. Said valve-stem 9 is provided with a substantially diametrical recess 11 adapted to register with either pair of adjacent ports as will be apparent from a comparison of Figs. 2 and 3. A handle 12 is provided at the upper end of said valve-stem whereby said valve may be readily controlled.

From the foregoing description it is obvious that when the valve is open as shown in Fig. 2, the steam will be allowed to pass from pipe 4 to pipe 6 as indicated by the arrows. When it is desired to stop the machine to which my valve is applied by merely turning the handle ninety degrees the recess 11 will register with the ports 5 and 7 as shown in Fig. 3, thereby immediately cutting off the steam supply from pipe 4 and instantly releasing any steam that is in the cylinder through exhaust pipe 8.

The utility, adaptability, and advantages of my improved form of cut-off valves for saw mill carriages being obvious, it is unnecessary to further enlarge upon the same herein.

Having now described and pointed out the new and useful features of my invention, I do not limit myself to the shape of certain parts where the shape is not essential, nor do I restrict myself to the exact details of construction shown and described, but mean and intend to claim all equivalents and variations thereof not departing in principle from my invention, and falling within the purview of the appended claim.

What I claim as my invention and desire to secure by Letters Patent is:

A cut-off valve including a casing provided with a vertical bore, said casing having a pair of transverse alining ports through opposite sides thereof off-center of the bore and communicating with the bore, the casing having an additional transverse port off-center of the bore and extending through the side wall farthest from that portion through which the alining ports are disposed, said last mentioned port communicating with the bore in the horizontal plane of the alining ports, a concentrically mounted vertically disposed valve stem rotatable in the bore of the casing and formed with a substantially diametrical recess disposed in the same horizontal plane with the ports, and means for bringing the recess in registration with certain of said ports.

In testimony whereof I affix my signature hereto.

WILLIAM W. HARMAN.

Copies of this patent may be obtained for five cents each, by addressing the "Commissioner of Patents, Washington, D. C."